(12) United States Patent
Ishii et al.

(10) Patent No.: US 6,988,860 B2
(45) Date of Patent: Jan. 24, 2006

(54) CUTTING TOOL AND CUTTING METHOD USING THE CUTTING TOOL

(75) Inventors: Katsuhiko Ishii, Kurashiki (JP); Masayuki Sugie, Niwa-gun (JP)

(73) Assignee: OKUMA Corporation, Aichi (JP)

( * ) Notice: Subject to any disclaimer, the term of this patent is extended or adjusted under 35 U.S.C. 154(b) by 255 days.

(21) Appl. No.: 10/347,635

(22) Filed: Jan. 22, 2003

(65) Prior Publication Data

US 2003/0143047 A1    Jul. 31, 2003

(30) Foreign Application Priority Data

Jan. 25, 2002   (JP)   .............................. 2002-016665

(51) Int. Cl.
*B23D 1/20*    (2006.01)
*B23D 13/00*   (2006.01)

(52) U.S. Cl. ..................... 409/132; 409/297; 409/288; 407/54; 407/65

(58) Field of Classification Search ............... 409/131, 409/132, 232, 288, 297, 298, 299, 300, 301, 409/308, 345, 347, 348, 293; 407/53, 54, 407/65

See application file for complete search history.

(56) References Cited

U.S. PATENT DOCUMENTS

| | | | | |
|---|---|---|---|---|
| 4,132,493 A * | 1/1979 | Hosoi | .......................... | 407/53 |
| 4,242,019 A * | 12/1980 | Roch | .......................... | 409/235 |
| 4,527,244 A * | 7/1985 | Graham et al. | ............. | 409/100 |
| 5,090,851 A * | 2/1992 | White | ........................ | 409/211 |
| 5,378,091 A * | 1/1995 | Nakamura | .................. | 409/132 |
| 5,595,463 A * | 1/1997 | Takegahara et al. | ........ | 409/132 |
| 5,669,867 A * | 9/1997 | Hoppe | ........................ | 409/235 |
| 6,491,482 B1 * | 12/2002 | Fenkl et al. | ................ | 409/132 |
| 6,491,483 B1 * | 12/2002 | Ford | .......................... | 409/182 |
| 6,601,484 B1 * | 8/2003 | Katoh et al. | ................. | 82/1.11 |

FOREIGN PATENT DOCUMENTS

| | | | |
|---|---|---|---|
| DE | 3209879 A1 * | 9/1983 | |
| JP | A 2001-9603 | 1/2001 | |

* cited by examiner

*Primary Examiner*—Boyer D. Ashley
*Assistant Examiner*—Dana Ross
(74) *Attorney, Agent, or Firm*—Oliff & Berridge, PLC

(57) ABSTRACT

A cutting tool having a blade section on one end is mounted on a spindle of a cutting machine, and the blade section is contacted with a workpiece to perform planing of the workpiece into a desired shape. Because the tip of the blade section is disposed on the spindle axis, the position of the cutting edge is controlled by performing drive control of the X-axis and Y-axis of the spindle. Thus, the control of the cutting machine is simplified, and path errors resulting from synchronous control can be eliminated.

3 Claims, 13 Drawing Sheets

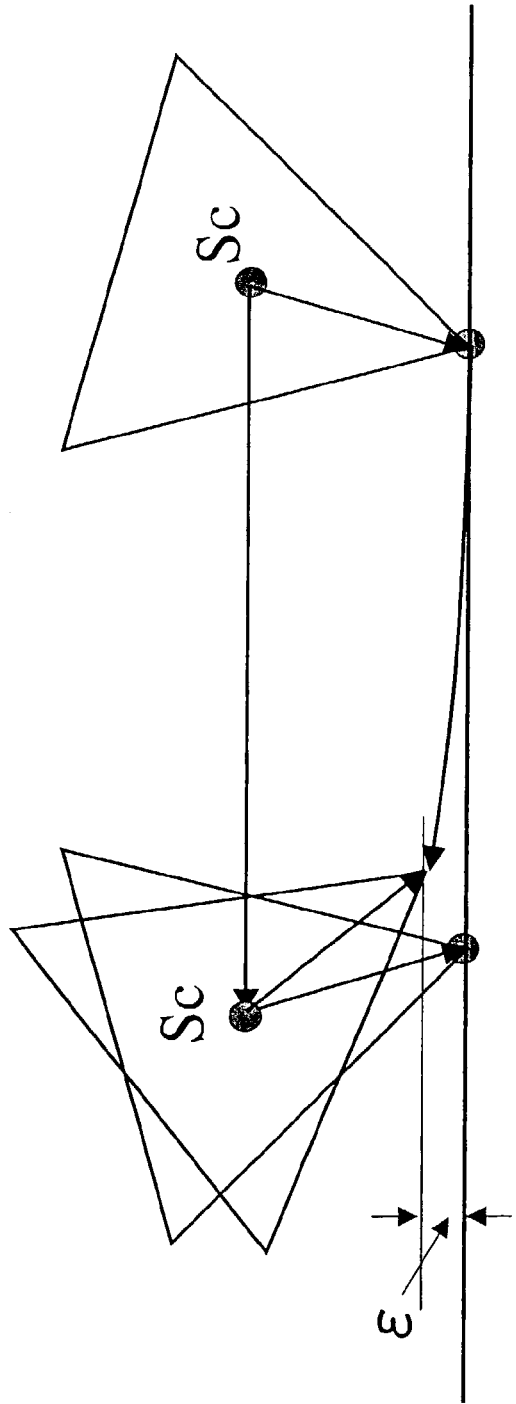
Fig. 11A PRIOR ART
Fig. 11B PRIOR ART

US 6,988,860 B2

CUTTING TOOL AND CUTTING METHOD USING THE CUTTING TOOL

BACKGROUND OF THE INVENTION

1. Field of the Invention

The present invention relates to a cutting tool which is mounted on the spindle of a cutting machine, and to a cutting method by using the above tool.

2. Related Art

To perform cutting work using a machine tool or the like, a cutting tool, such as an end mill, having a cutting edge at its tip is mounted on a spindle, and the cutting tool is rotated and contacted with a workpiece to cut out a desired shape.

As an example of such art, Japanese Patent Laid-Open Publication No. 2001-9603 discloses a cutting method. The cutting method disclosed in that publication is especially applicable to the cutting of inner corners of a pocket hole or the like. In the disclosed inner corner cutting method, a cutting tool having a cross-sectional shape as shown in FIG. 9 and a plurality of cutting parts along the circumference at the bottom edge of the tool is mounted on the spindle of the machine tool, a rotation angle of the cutting tool and a position of the spindle on a coordinate system of the machine tool or the workpiece are synchronously controlled, and a relative position of the cutting tool to the workpiece is controlled according to the rotation angle of the cutting tool so that outer end points of the cutting parts draw a locus of movement along a desired inner corner shape, thereby moving while cutting in a direction of the tool's axis. FIG. 10 shows an example of the cutting edge locus of the outer end points of the cutting parts according to the above machining method and the relative movement locus of the cutting tool to the workpiece which is necessary to draw the cutting edge locus.

However, when an inner corner of a pocket hole or the like is cut as described in the above-cited publication (No. 2001-9603), it is necessary to perform accurate synchronous control of the rotating axis which controls the rotation angle of the cutting tool and a feed axis which controls relative movement (generally, movement of the X-, Y-axes on a plane perpendicular to the spindle axis) of the cutting tool. Because the feed rate of the feed axis is variable, both axes accelerate and decelerate during operation, and the axes have different following characteristics, synchronization is a problematic and complicated process. As a result, a path error ∈ commonly occurs at the outer end point of the cutting part of the cutting tool because of a loss of synchronism, resulting in a machined shape error such as shown in FIGS. 11A, 11B.

The synchronous control has a problem that when the spindle moves from a command block (a command for a rotation angle of the spindle, a command for a position of the spindle) to the spindle, on which the cutting tool is mounted, to the next command block in certain timing, the cutting edge of the cutting part of the cutting tool rotates, and a distance in a direction perpendicular to the moving direction of the spindle varies as shown in FIG. 12. The result is a path error ∈ on the circumference of the cutting part in the moving path of blocks. When, in order to avoid such a problem, the travel distance of the component block is reduced, an enormous amount of NC data on linear interpolation of sequential small moving blocks is required, the amount of arithmetic processing of the machining program increases, and a load on the controller for a motor for controlling the movement also increases. Thus, the machining time is increased.

Additionally, when there is an uncut, unmachined portion on the side opposite to the machined surface as shown in FIG. 13, the above-described machine tool has a disadvantage that, when the cutting tool is rotated and the cutting edge will cut this area if it has a large rotating radius. However, when a thin cutting tool with a cutting edge having a small rotating radius is used to avoid such a problem, an L/D (tool length/tool diameter) becomes large, and the rigidity of the tool degrades. As a result, there is a problem that the tool is bent, the tool chatters when machining, or the like.

SUMMARY OF THE INVENTION

The present invention advantageously provides a cutting tool whose control is simplified and which does not produce a path error by the above-described synchronous control, and a cutting method which advantageously employs this cutting tool.

The present invention relates to a cutting tool which is mounted on a spindle capable of rotating the cutting tool of a cutting machine, wherein the tip of a blade section having a prescribed length and subject to feed control for the cutting tool, is disposed on the spindle axis.

The present invention also relates to a method of cutting a workpiece into a desired shape by mounting a cutting tool, which has a blade section at one end, on a spindle, contacting the blade section with the workpiece, and relatively feeding the blade section to the workpiece, wherein the tip of the blade section having a prescribed length and subject to feed control of the cutting tool, is disposed on the spindle axis.

Because the cutting edge of the cutting tool of the present invention is arranged on the spindle, highly accurate synchronous control is not required to control a rotating angle and the relative movement of the cutting tool and the workpiece, and path errors resulting from synchronous control difficulties can be eliminated.

BRIEF DESCRIPTION OF THE DRAWINGS

FIG. 11A is a diagram showing a path error of an outer end point of the cutting part due to a following position error in the related art;

FIG. 11B is a diagram showing a path error of an outer end point of the cutting part due to a following position error in the related art;

DESCRIPTION OF THE PREFERRED EMBODIMENTS

Embodiments of a cutting tool of the present invention and a cutting method using the cutting tool will be described below.

Figure 1:
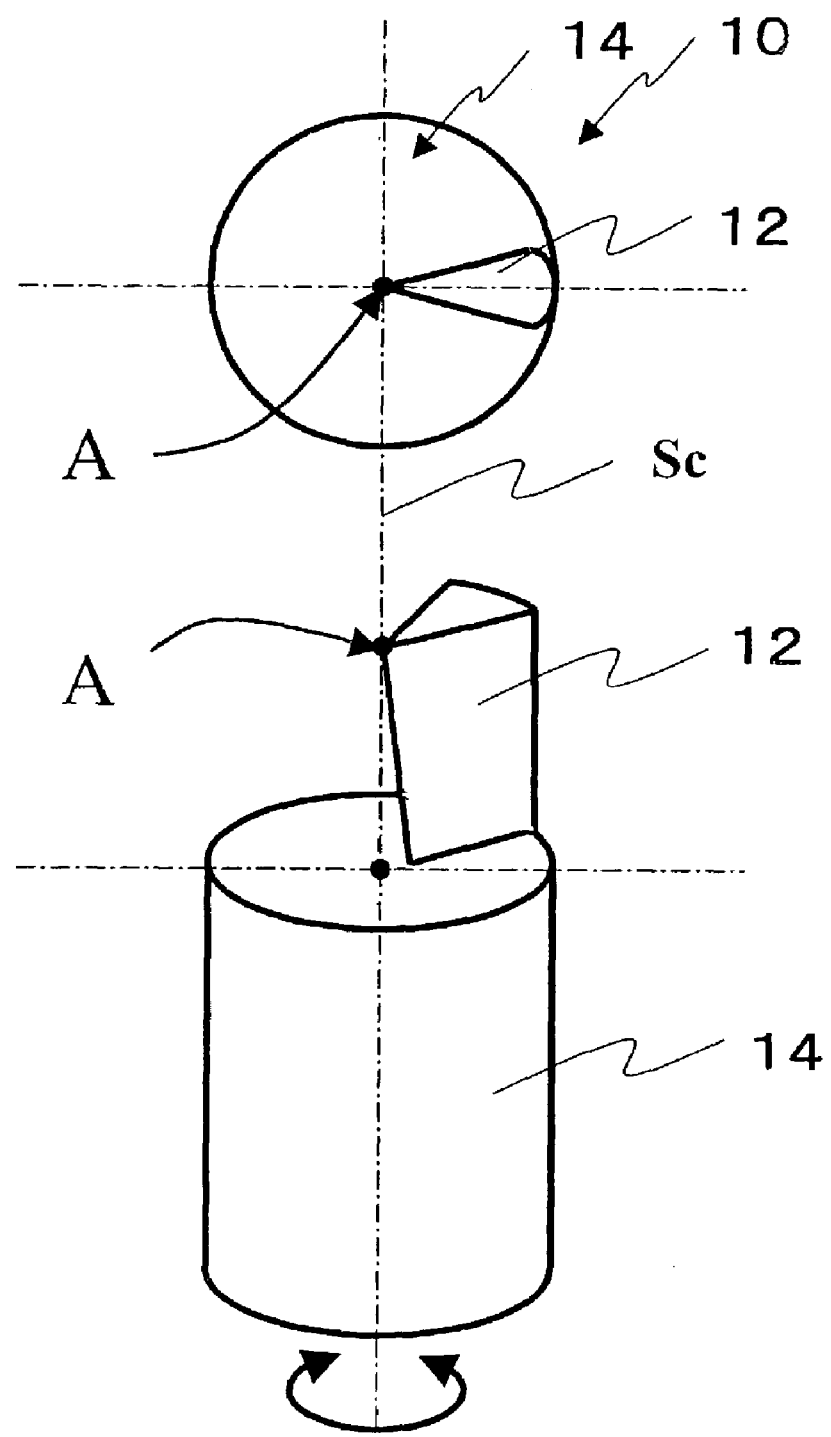
FIG. 1 is a perspective diagram of a cutting tool which is mounted on a cutting machine according to a first embodiment of the present invention.

A cutting tool 10 which is mounted on a cutting machine according to a first embodiment of the present invention is shown in FIG. 1. The cutting tool 10 is mounted on the spindle of the cutting machine. The cutting machine is provided with a motor for controlling the position of the spindle and a motor for controlling the position of a workpiece so to control a position (X, Y) of the spindle against the workpiece on a plane perpendicular to a spindle axis Sc. These X- and Y-axes are subject to feed control to perform planing by the cutting tool 10. The spindle is provided with a motor for controlling rotation (performing rotational control) of the cutting tool 10 in an arrow direction of FIG. 1 and a motor for controlling the vertical movement in a direction of the spindle axis Sc.

Here, the cutting tool 10 has a rod shape, its upper end is a blade section 12, and the lower end is a holder section 14 for connection to the cutting machine in FIG. 1. The holder section 14 is inserted and fixed to a tool holder of the spindle of the cutting machine. The blade section 12 has a wedge shape and protrudes from the holder section 14 having a cylindrical shape. Point A indicating the cutting edge is on the center axis of the cylindrical shape of the holder section 14, and, when the cutting tool 10 is mounted on the spindle, the center axis of the cylindrical shape and the rotating center axis Sc of the spindle coincide, such that the point A of the cutting edge of the cutting tool 10 is positioned on the spindle axis Sc when it is mounted on the cutting machine. To align the point A of the cutting tool 10 with the spindle axis Sc, the blade section 12 may be adjusted by manually sharpening the edge or by using a tool holder which has a tool position adjusting function. Because the multiple cutting edges of tools according to related art have a plurality of cutting points, such cutting points cannot be aligned by the tool position adjusting function while the tool is rotating, and the adjustment by sharpening requires highly skilled work. Because the cutting part is a single unit in this embodiment, the position adjusting function of the tool or the sharpening by the manual work can be employed to easily align the tip of the tool with the center line of the spindle.

Figure 2:
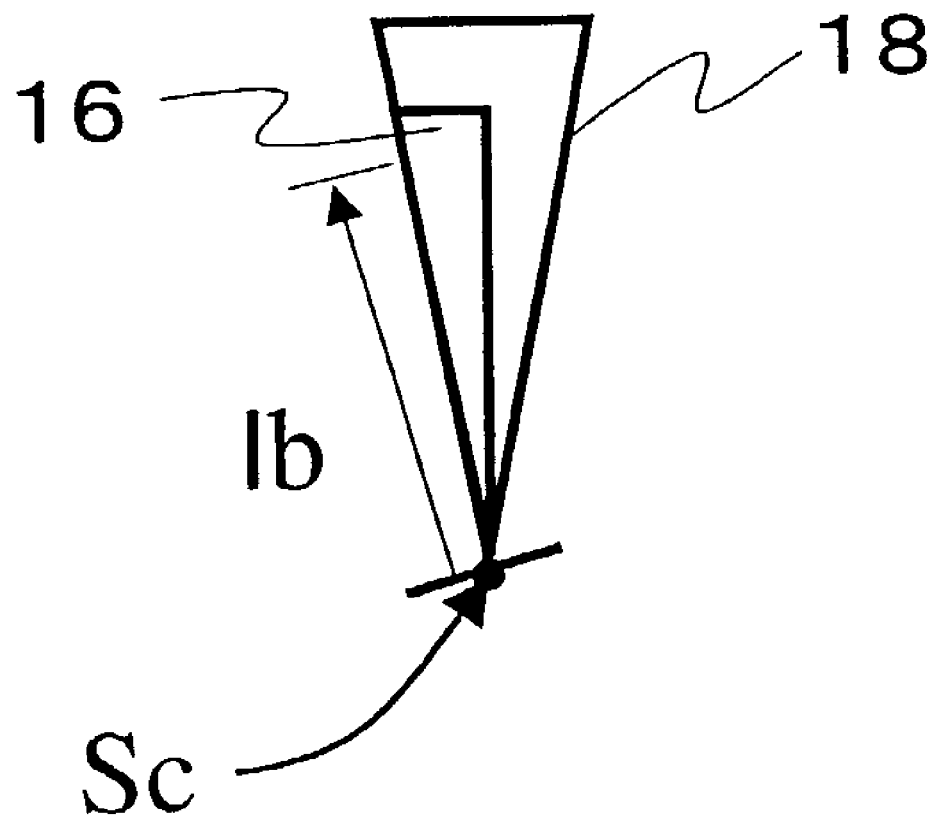
FIG. 2 is a structure diagram of the cutting tool according to the first embodiment viewed from a direction of its tip.
Figure 9:
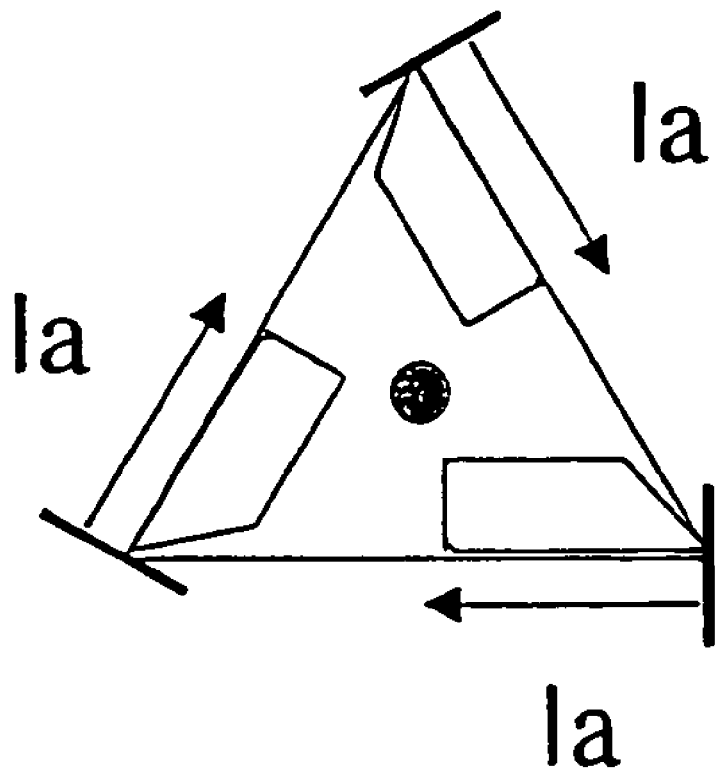
FIG. 9 is a structure diagram showing a conventional cutting tool.
Figure 10:
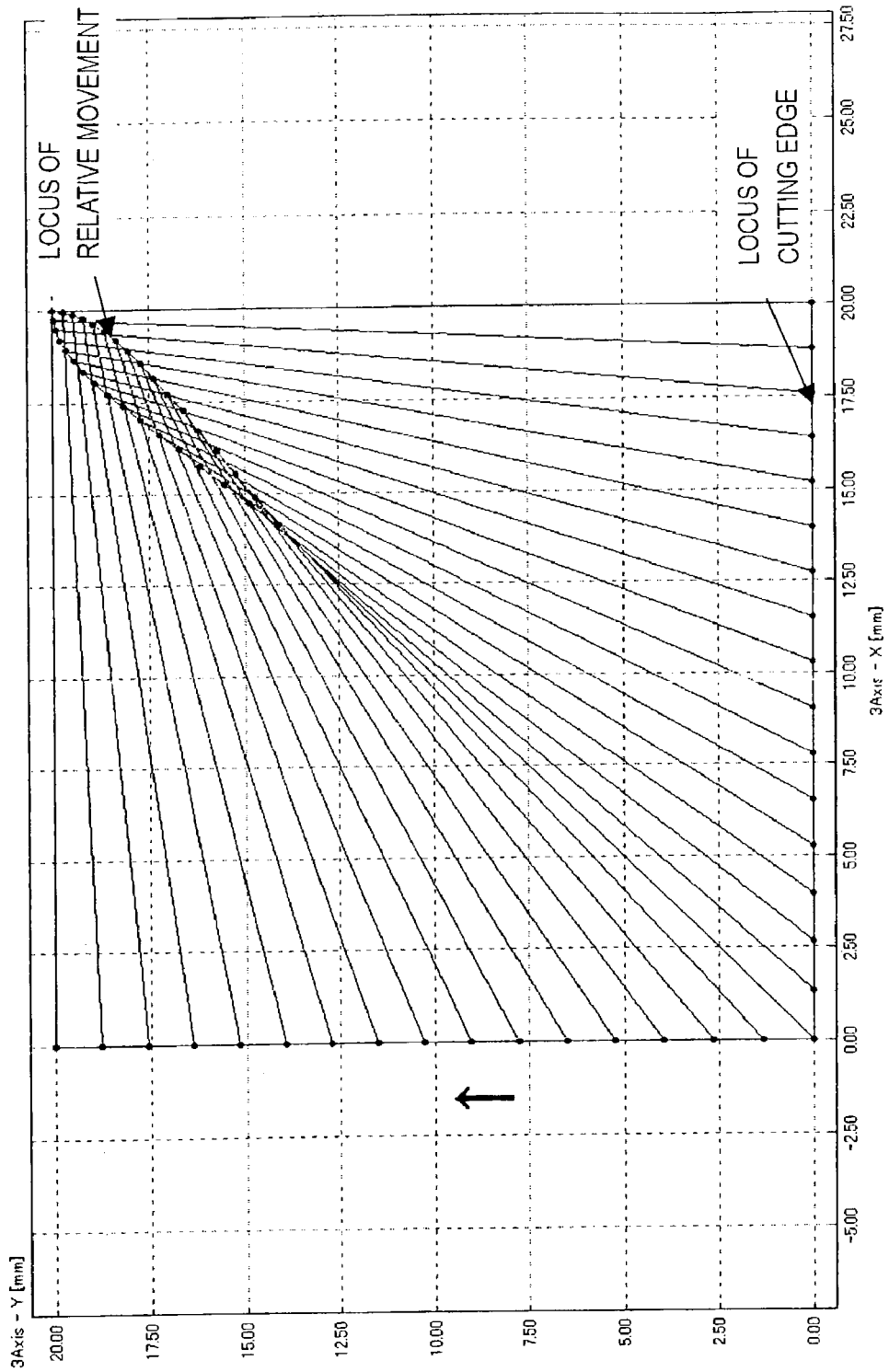
FIG. 10 is a diagram showing the locus of a cutting edge and the locus of a relative movement of a conventional cutting tool.
Figure 12:
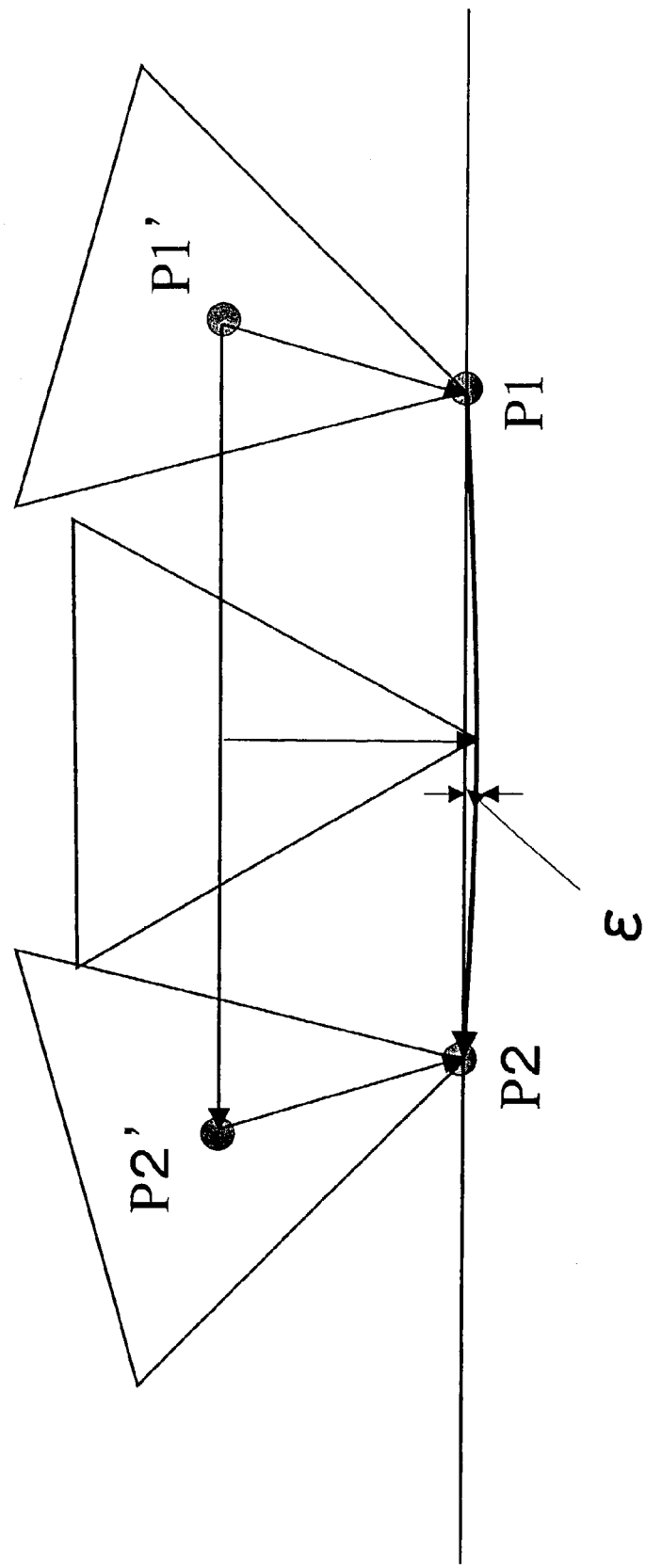
FIG. 12 is a diagram showing a path error of an outer end point of the cutting part between blocks in the related art.
Figure 13:
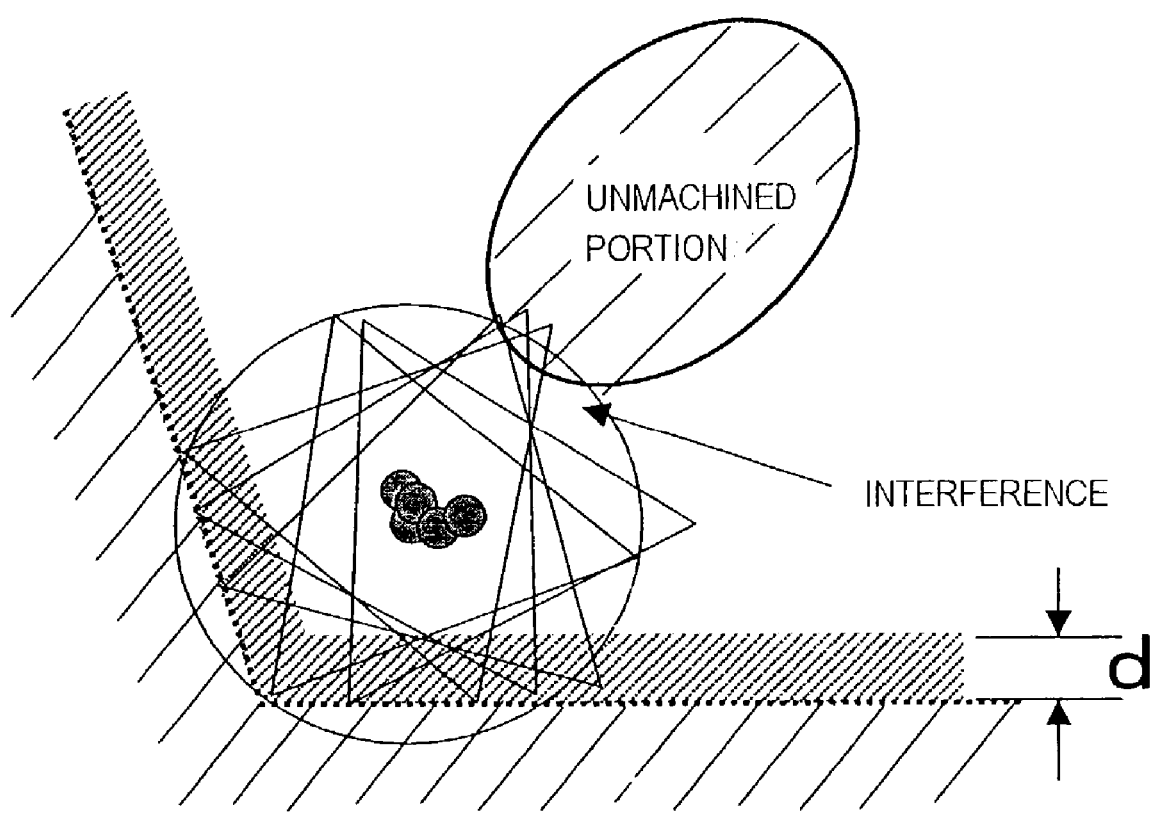
FIG. 13 is a schematic diagram showing cutting work of an inner corner by a conventional cutting machine.

A structure of the blade section 12 of the cutting tool 10 is shown in FIG. 2. FIG. 2 is a drawing of the cutting tool 10 viewed from its tip. The blade section 12 comprises a single cutting part 16 for cutting a workpiece and a support section 18 for supporting the cutting part 16 during cutting. The cutting tool 10 is configured to have the cutting part 16 placed to extend from the side of the blade section 12 to the base section of the tip. The cutting part 16 has a blade length Ib. Because the conventional cutting tool with cutting parts arranged at outer end points as shown in FIG. 9 performs cutting by rotating the spindle, the blade length Ia is limited to the distance from the outer end point of the tool to the vicinity of the spindle's axis Sc. The cutting tool 10 of this embodiment, however, performs cutting by moving the feed axis of the cutting tool, so that the cutting tool blade length Ib can be much larger. Accordingly, the cutting depth (cut-in depth or level) can be much deeper.

This embodiment has a feature that the tip of the blade section 12 having a predetermined length in a direction of the spindle axis of the cutting tool 10 is arranged to be on the spindle axis. The cutting machine performs synchronous control on the X-axis and Y-axis positions of the spindle and the rotation angle of the spindle. However, because the tip of the cutting part 16 of the cutting tool 10 is configured along the spindle axis, a change in rotation angle of the spindle does not affect the tip of the cutting part 16 with respect to the spindle axis which is subject to the positional control for the X-axis and the Y-axis. Therefore, the position of the tip of the cutting part 16 depends only on the positional control on the X-axis and Y-axis of the spindle. Thus, accurate synchronous control for the rotation angle and the X-axis and Y-axis positions is made unnecessary. Because a moving path of the cutting edge is not affected by a change in a cutting angle of the tool cutting part 16, path errors resulting from synchronous control, including those between command blocks, are not caused, and high-precision working path for moving the cutting edge of the cutting tool 10 along a desired cutting shape can be designed.

Figure 3:
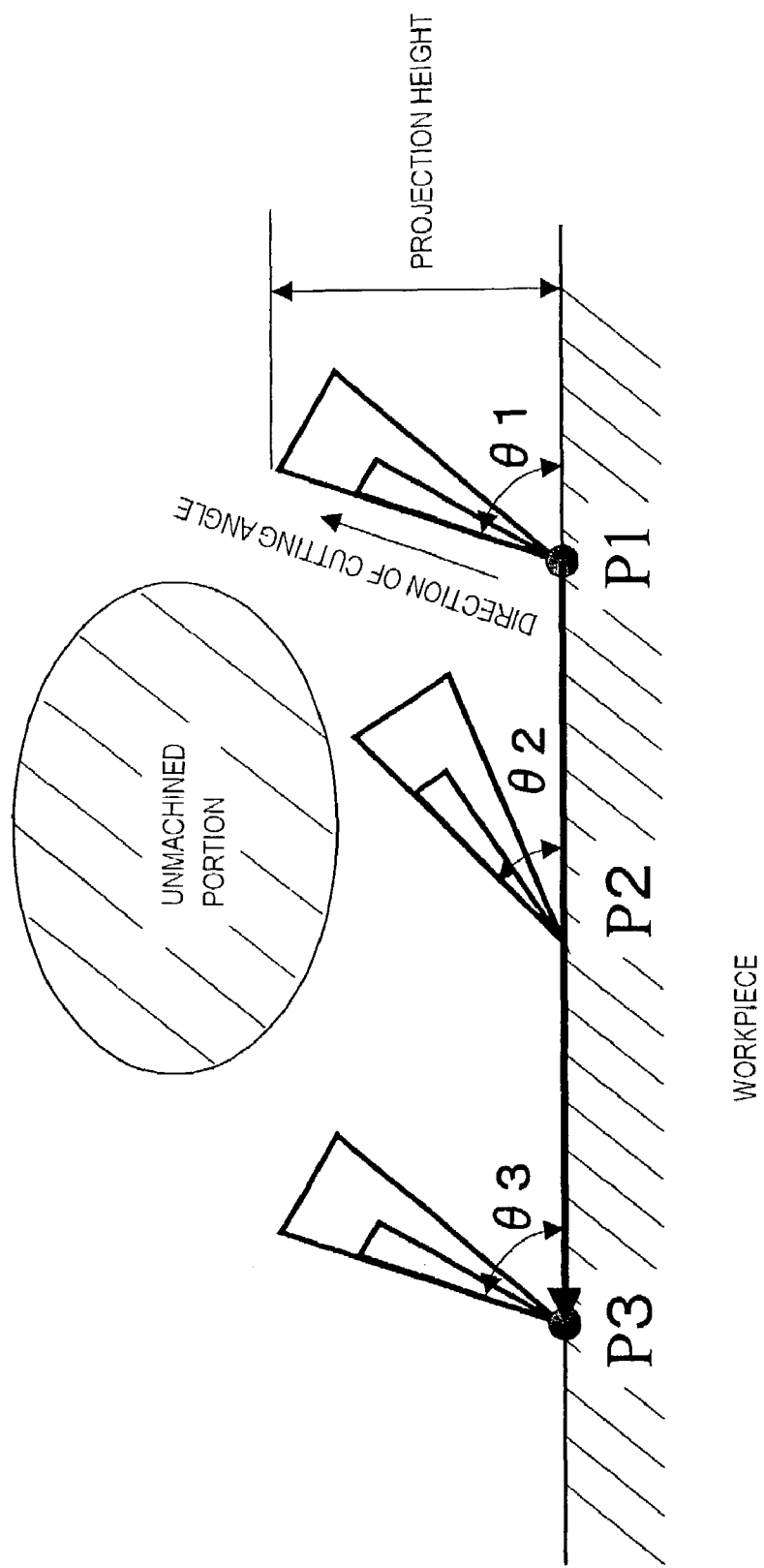
FIG. 3 is an explanatory diagram illustrating the control of the cutting tool of the cutting machine according to the first embodiment.

The cutting machine of this embodiment has a cutting tool 10 as described above mounted on its spindle, causes the cutting part 16 of the blade section 12 to come into contact with a workpiece, and controls the X-axis and Y-axis positions of the spindle to perform a feeding movement so to conduct planing. An example operation of the cutting tool 10 to perform planing is shown in FIG. 3.

The cutting machine controls motors for driving the spindle on the X-axis and on the Y-axis to move the cutting edge of the tool 10 from a point P1 to a point P3 via a point P2, and simultaneously controls a motor for rotating the spindle to change the cutting angle, which is θ1 at the point P1, of the cutting part 16 to θ2 at the point P2 and to θ3 at the point P3. As shown in FIG. 3, an unmachined portion at a position opposite to a work surface may make it impossible for the cutting tool 10 to perform cutting. But, this embodiment controls the rotation of the spindle to change a cutting angle θ of the cutting tool 10 in order to prevent any interference. In other words, because the cutting tool 10 has a cross-sectional shape such that the length in the direction of the cutting angle, indicated by an arrow in FIG. 3, is longer than that in a direction perpendicular to the direction of the cutting angle, when the cutting angle θ is changed, a projection height h to the feed direction of the cutting tool 10 can be made smaller than the space between the workpiece and the unmachined portion, such that the cutting tool 10 can pass through the available space.

When the cutting angle is to be changed, the means of the spindle calculates the projection height from the stored cross-sectional shape data on the blade section 12 of the cutting tool 10. According to the present simplified example, the projection height h is calculated by an equation {(a length in the direction of the cutting angle by the blade section)*sin θ}.

The cutting machine detects any chatter of the cutting tool 10 through a sensor, and controls the cutting angle of the tool to an angle at which the chatter is eliminated. Thus, chatter during cutting operations can be suppressed.

Figure 4:
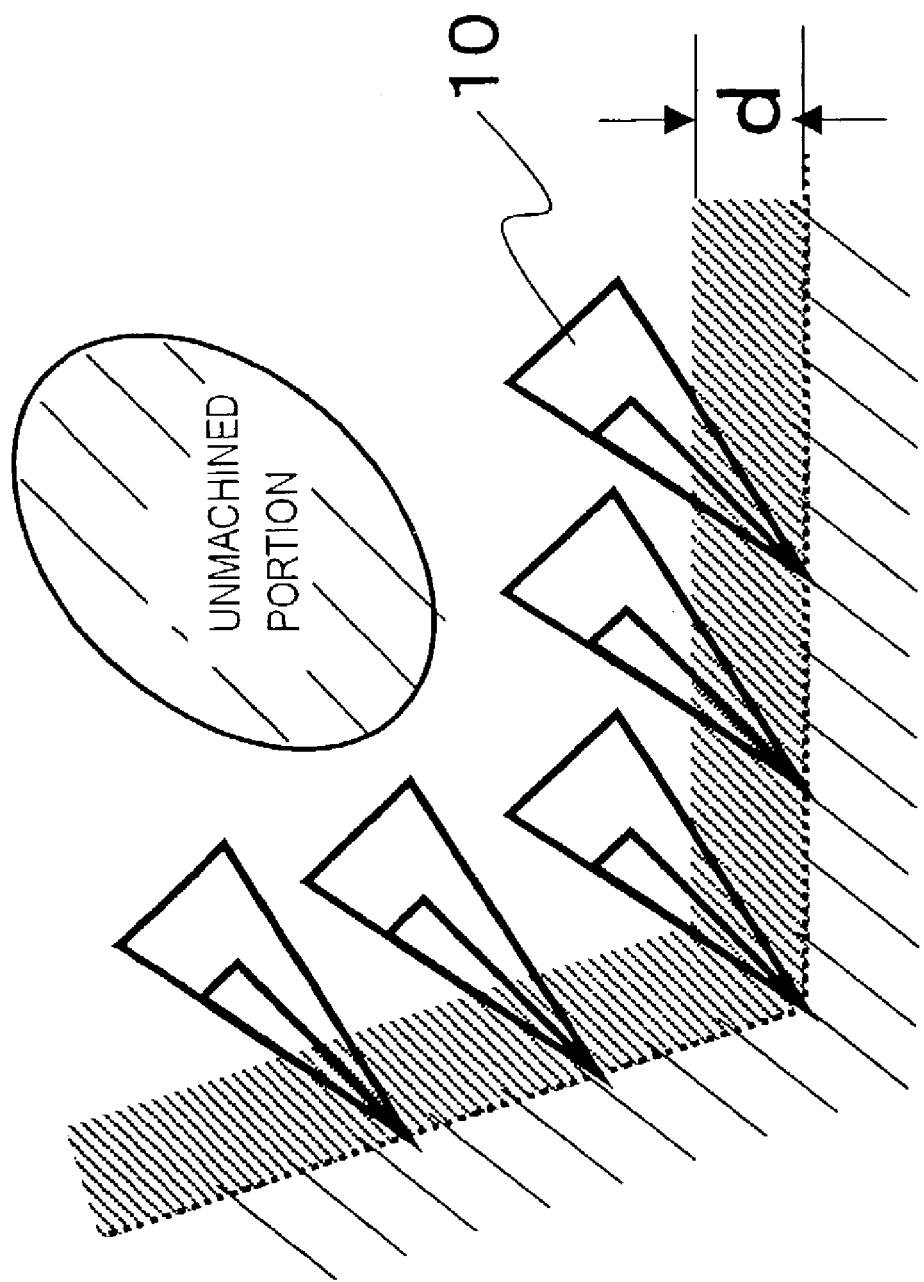
FIG. 4 is an explanatory diagram illustrating the control of the cutting tool of the cutting machine according to the first embodiment.

FIG. 4 is a diagram showing the movement of the cutting tool 10 which cuts an inner corner in a workpiece. In the drawing, a width d indicates the depth cut away by the cutting tool 10. To cut an inner corner, the spindle may be rotated to control a cutting angle of the cutting tool 10 so as to avoid unmachined portions of the workpiece. Because the cutting edge is on the spindle axis, it is not necessary to perform synchronous control of a rotation angle of the spindle as in the related art, such as that disclosed in Japanese Patent Laid-Open Publication No. 2001-9603, when the cutting edge is moved along the shape of the corner. Thus, it is possible to simplify an arithmetical operation and a control operation performed by the cutting machine for the corner machining.

Then, the cutting machine according to a second embodiment of the present invention will be described.

Figure 5:
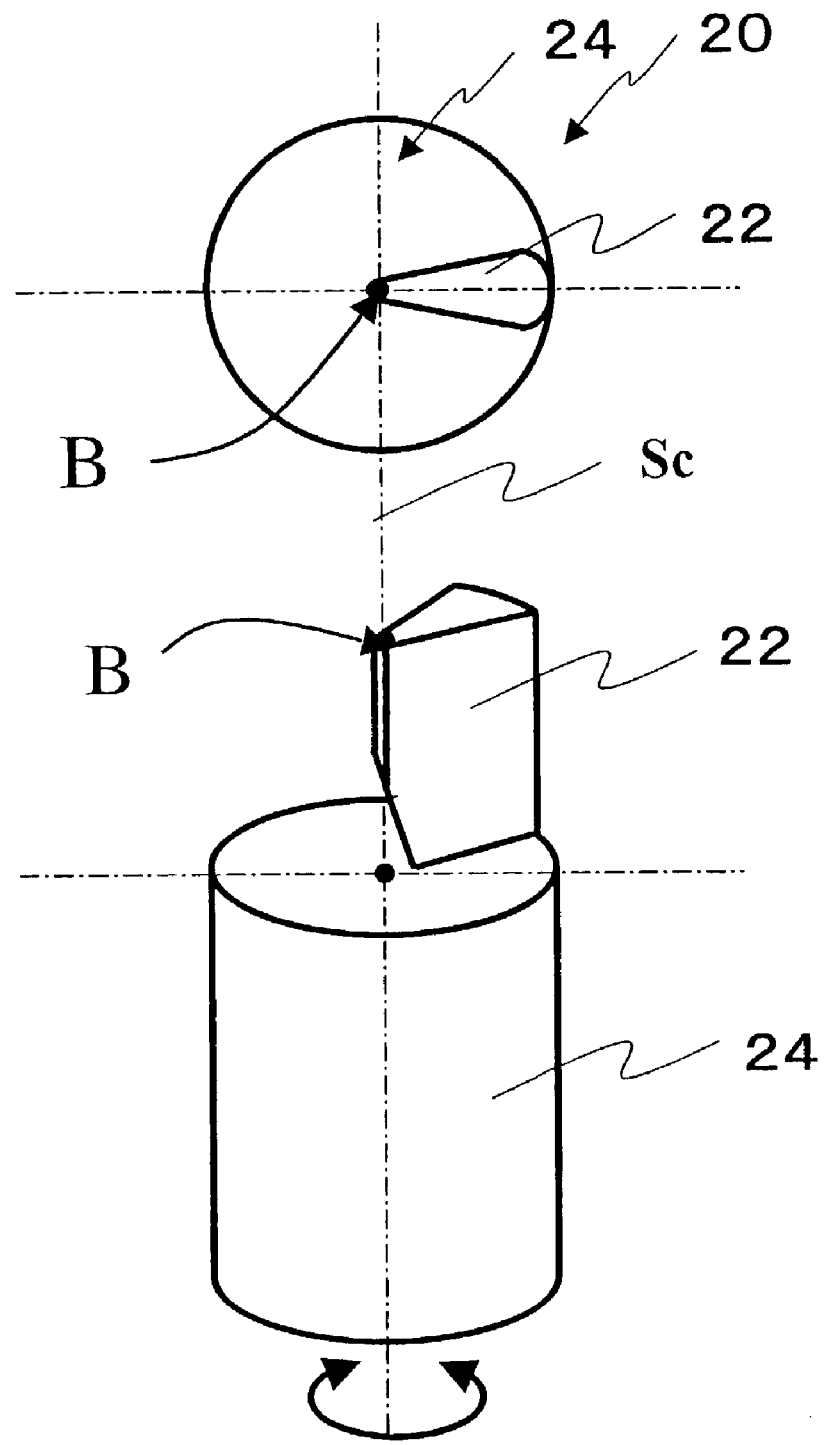
FIG. 5 is a perspective diagram of the cutting tool which is mounted on the cutting machine according to a second embodiment of the present invention.

A cutting tool 20 which is mounted on the cutting machine according to the second embodiment is shown in FIG. 5. A cutting edge B of a blade section 22 of the cutting tool 20 is disposed on the spindle axis Sc in the same way as in the first embodiment. In the second embodiment, the radius of the cutting edge B is in the horizontal direction, and the center of the radius at the tool tip is disposed on the spindle axis Sc. The curved part (the arc shape part) with the radius is a machining face which can cut a workpiece. Because the tool's tip has the radius, the life of the cutting edge is extended compared with that of the cutting tool 10 of the first embodiment, in which only one point of the cutting edge is used for cutting.

Figure 6:
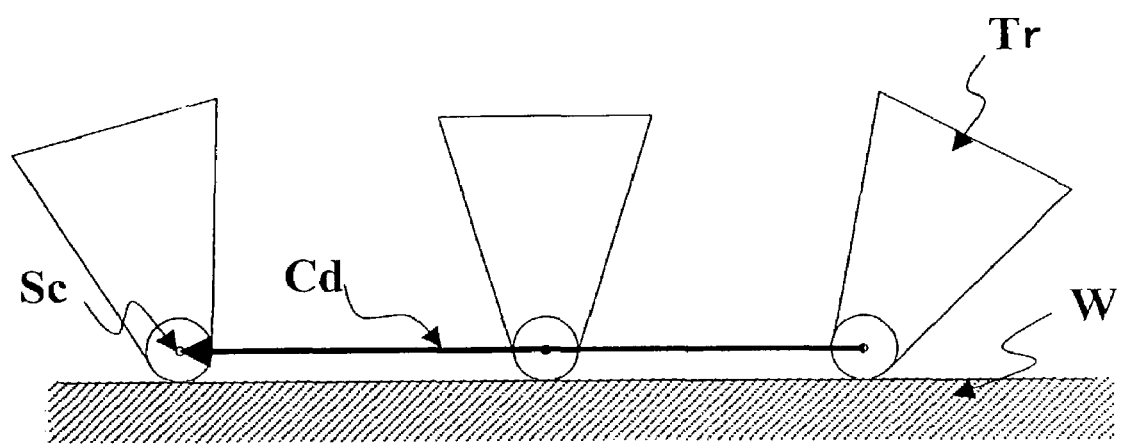
FIG. 6 is an explanatory diagram showing a path of the cutting edge of the cutting tool according to the second embodiment.

FIG. 6 is a diagram showing the movement of the cutting tool 20 when the spindle of the cutting machine is subject to feed control. At this case, the spindle's center position Sc draws a locus Cd which is offset in a horizontal direction by the radius R of the tool tip of the cutting part with respect to a machining shape of a workpiece W. The rotation angle of the spindle is also changed, but a path error is not caused by the synchronous control as in the first embodiment because the distance from the spindle axis to the work surface is always a constant radius R in this second embodiment.

Next, the cutting machine according to a third embodiment of the present invention will be described.

Figure 7:
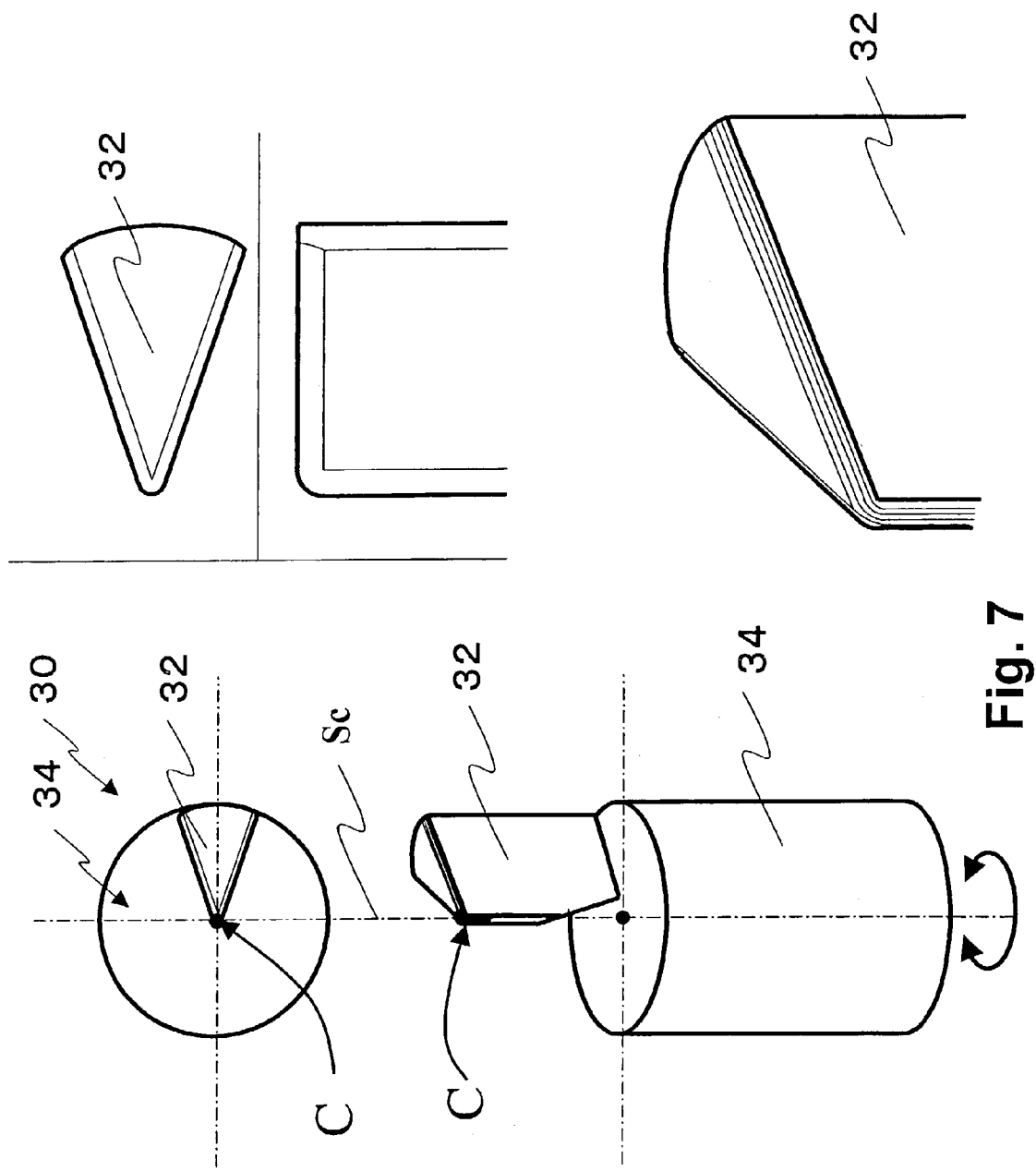
FIG. 7 is a perspective diagram of the cutting tool which is mounted on the cutting machine according to a third embodiment of the present invention.

A cutting tool 30 to be mounted on the cutting machine according to the third embodiment is shown in FIG. 7. In the cutting tool 30, the tip on the cutting edge is formed a portion curving and the tip is formed a radius on any part of the cutting edge in the horizontal direction.

Figure 8:
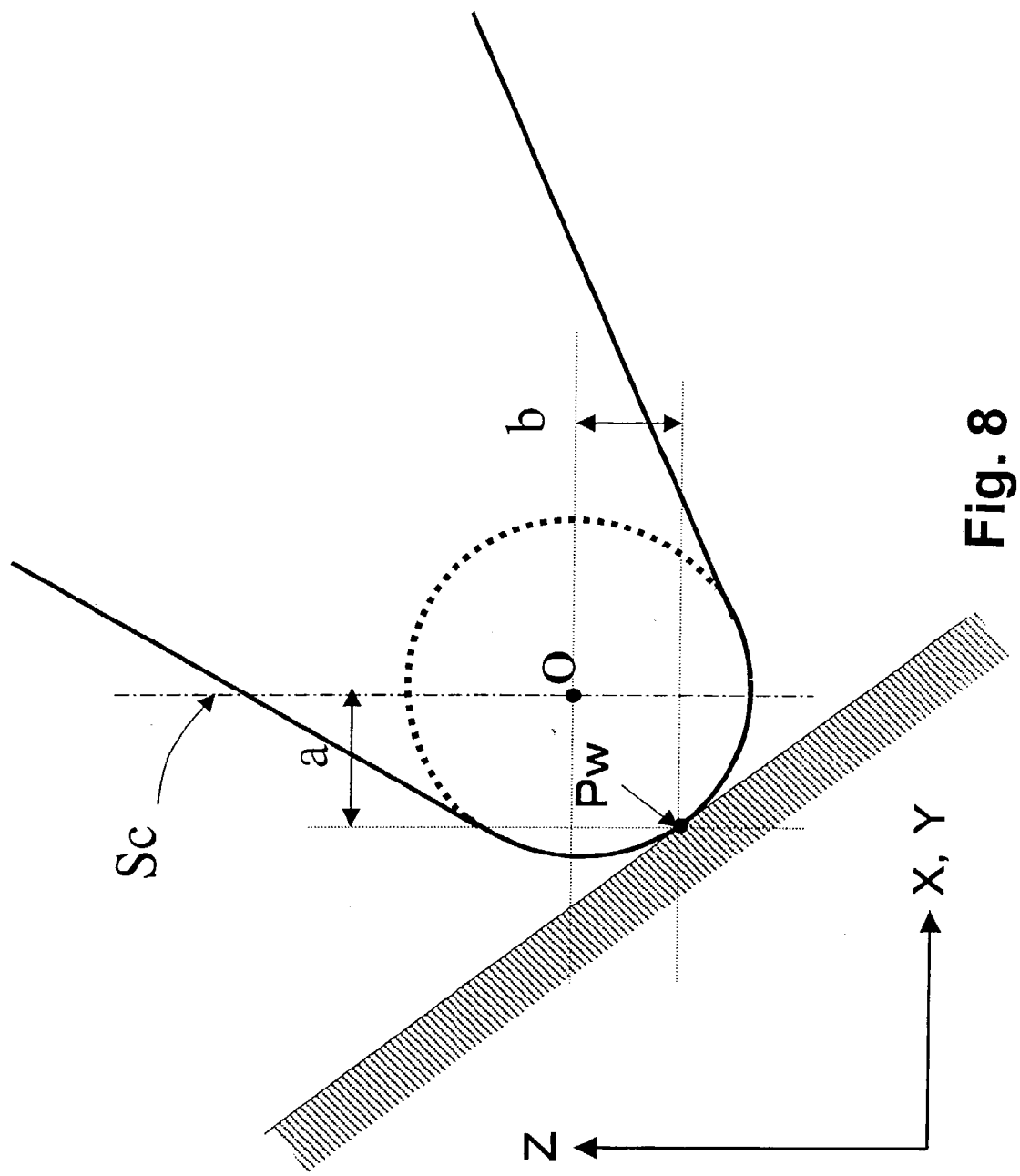
FIG. 8 is an explanatory diagram illustrating the control of the cutting edge of the cutting tool according to the third embodiment.

FIG. 8 is a schematic diagram showing the cutting tool 30 cutting a sidewall having a given inclination angle in the direction of the spindle axis (z-axis) against the X-axis and Y-axis. As cutting is performed by the cutting tool 30, an offset a of a horizontal component from a cutting point Pw of the machining shape to the spindle center line may be used for a command position of the locus of movement Cd of the spindle's center position in the X-axis and Y-axis directions, to thereby produce a locus of movement of a point. This point is offset by a distance a from the cutting point Pw of the programmed machining shape to the center point O of the cutting edge in the horizontal direction. A command position in the Z-axis direction may produce a locus of movement of a point which is offset in the vertical (Z-axis) direction by a distance b from the cutting point Pw of the machining shape to the center point O of the cutting edge.

The cutting tools described in the above embodiments are used for description of typical embodiments and not limited to the described shapes.

The cutting machine of the above embodiments has advantages over electric discharge machines. For example, because electric discharge machines require that electrodes be positioned before electric discharge machining can be performed, working cost becomes high as the working steps increase, and working lead time also increases. Such a problem does not exist with the present invention because planing is performed.

In general, while there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A cutting tool for mounting on a spindle of a cutting machine, comprising:
   a holder section; and
   a single wedge-shaped blade section protruding from the holder section,
   wherein:
   the cutting tool is of substantially an overall rod shape,
   the blade section has a prescribed length of the cutting tool and is subject to feed control,
   a cutting edge of the blade section is located on an extended center axis of the holder section,
   when the cutting tool is mounted on a spindle, the center axis of the holder section and a spindle axis of the spindle in which the cutting tool is mounted coincide, such that the cutting edge of the cutting tool is positioned on the spindle axis, the single blade section has a linear shape along a single radius extending from the spindle axis, and cutting is executed by non-rotating linear movement of the cutting tool.

2. A method of cutting a workpiece into a desired shape, comprising:
   mounting a cutting tool according to claim 1 on a spindle;
   contacting a blade section of the cutting tool with the workpiece;
   maintaining a uniform cutting angle of the edge of the blade section with respect to the workpiece; and
   feeding the blade section relative to the workpiece.
   wherein cutting is executed by a linear movement of the cutting tool.

3. The method for cutting a workpiece according to claim 2, wherein when a projection height needs to be changed, a rotational angle of the spindle is controlled to change the cutting angle of the tool with respect to the workpiece, and the change of the cutting angle changes the projection height.

* * * * *